C. V. PETTIBONE.
Wooden Liquid Measure and Funnel.
No. 213,244.  Patented Mar. 11, 1879.
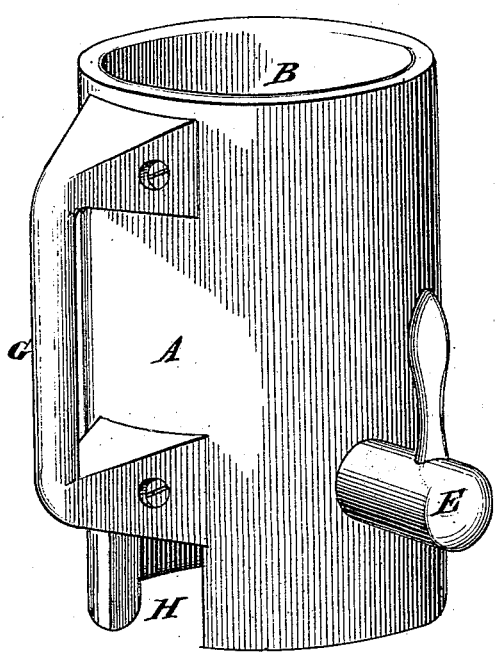
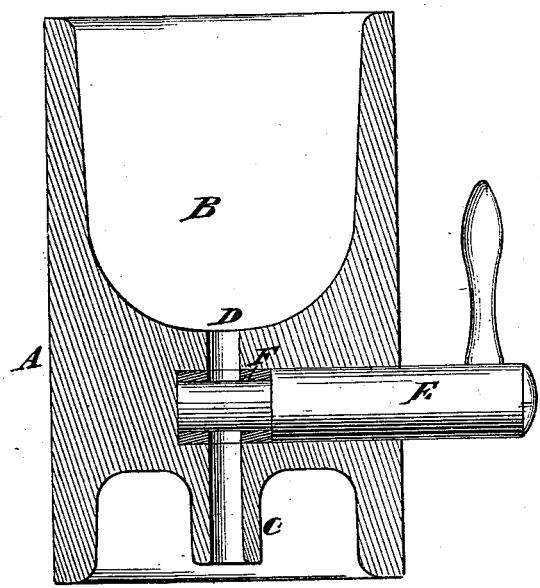
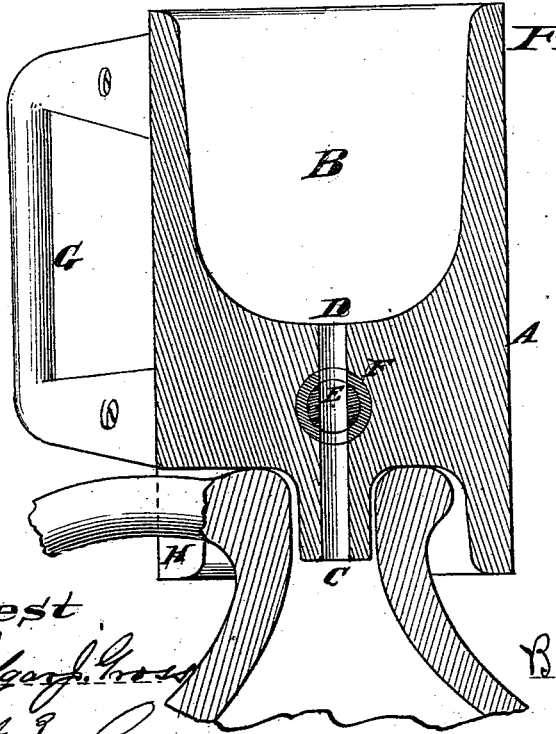
Inventor
C. Vallette Pettibone
By Hosea T. Ellsworth
His Attys.
Attest
Edgar J. Gross
A. L. Ross

UNITED STATES PATENT OFFICE.

CHAUNCEY V. PETTIBONE, OF FOND DU LAC, WISCONSIN.

IMPROVEMENT IN WOODEN LIQUID MEASURE AND FUNNEL.

Specification forming part of Letters Patent No. 213,244, dated March 11, 1879; application filed December 17, 1878.

*To all whom it may concern:*

Be it known that I, C. VALLETTE PETTIBONE, of the city and county of Fond du Lac, and State of Wisconsin, have invented a new and Improved Vinegar Measure and Funnel combined; and I do hereby declare the following to be a full, clear, and exact description of the same, which will enable others skilled in the art to make and use it, reference being had to the accompanying drawings, forming part of this specification, in which—

Figure 1 is a perspective view of the device. Fig. 2 is a vertical section at right angles to the plane of the handle; and Fig. 3 is a sectional view, showing the device applied to a jug.

Similar letters of reference denote the same parts in the several figures of the drawings.

My invention has for its object to provide in one device a measure and funnel of non-corrosive material for use in measuring liquids and discharging them into a jug or other vessel; and to this end it consists, first, in constructing the device from a block of wood for the purpose of preventing it from being corroded by an acidulous liquid; and, secondly, in the peculiar construction by which the two instruments are combined in one device, and in the means by which the device is supported upon a jug while being filled and discharged, as I will now proceed to describe.

In the accompanying drawings, A represents the vessel, composed of a block of wood turned in cylindrical form, with its upper end recessed to form the measure B and its lower end recessed around a central projecting discharge-tube, C. This tube is formed in turning the vessel, and is afterward bored through into the bottom of the measure, as shown at D, thus forming a communication between them for the discharge of the liquid.

E is a wooden spigot inserted through the side of the vessel, so as to tap the passage D, and open or close it when turned, as may be required. The inner end of the spigot is reduced in diameter to receive a ferrule, F, of cork, by which a perfectly-tight joint is formed between the spigot and block around the discharge-passage. The discharge-tube terminates a short distance above the lower edge of the vessel, so that when the latter rests upon the floor it shall not be soiled by the dirt thereof or the accumulation of drainings beneath the tube.

G is the handle, preferably composed of wood, screwed or otherwise fastened to the vessel, and H is a recess formed in the lower edge of the vessel under the handle.

When the device is to be used in filling a jug, the tube is inserted in the mouth of the jug, and the handle of the latter enters the recess H, as shown in Fig. 3. The bottom of the vessel then rests upon the jug, and the sides and top of the recess, coming in contact with the jug-handle, hold the vessel in place while being filled and discharging its contents.

To operate the device, the spigot is first turned to close the discharge-passage D, and the measuring-vessel filled with the required liquid. The supply is then cut off and the spigot turned to empty the measuring-vessel into a jug or other receptacle. After having been used the device may be set aside and the spigot left open to drain the measure.

By constructing the device of wood, all danger from the corrosion by vinegar and other acidulous liquids is wholly avoided, and the measure kept clean and pure, while the combination of the measure and funnel in one instrument materially cheapens the cost of manufacture and lessens the expense and labor requisite for the use of a separate measure and funnel.

By placing the spigot in the vessel opposite the handle it can be easily pushed in to hold it securely in place when turned. This arrangement, however, is not absolutely essential.

Having thus described my invention, what I claim is—

1. The combined liquid-measure and discharge-funnel, made in one piece from a block of wood, recessed in the top to form the measure and in the bottom to form the funnel, in connection with the passage D, substantially as described, for the purpose specified.

2. The combined liquid measure and funnel consisting of the wooden block A, recessed in the upper end to form the measure B and in its lower end to form the discharge-tube C, said tube and measure communicating through a central passage, D, having the spigot G, and the wall of the vessel around the discharge-tube being recessed at H to receive a jug-handle, substantially as described, for the purpose specified.

3. The wooden liquid measure and funnel, made in one piece, with a central discharge-passage and draining-tube, a lateral spigot, a recess to receive a jug-handle when the discharge-tube is inserted in the mouth of the jug, and a suitable handle for lifting the device, substantially as described.

CHAUNCEY VALLETTE PETTIBONE.

Witnesses:
H. CLAY WILLS,
A. G. BREITENSTINE.